C. A. PARSONS & S. S. COOK.
MARINE PROPULSION.
APPLICATION FILED JULY 17, 1911.

1,006,674.

Patented Oct. 24, 1911.
3 SHEETS—SHEET 1.

Witnesses
Bent M Stahl
H. Alden

Inventors
Charles A. Parsons
Stanley S. Cook
by Spear, Middleton, Donaldson & Spear
Attorney

C. A. PARSONS & S. S. COOK.
MARINE PROPULSION.
APPLICATION FILED JULY 17, 1911.

1,006,674.

Patented Oct. 24, 1911.

3 SHEETS—SHEET 2.

Witnesses
Ben M. Stahl
H. Alden

Inventors
Charles A. Parsons.
Stanley S. Cook.
By Spear, Middleton, Donaldson & Spear
Attorney.

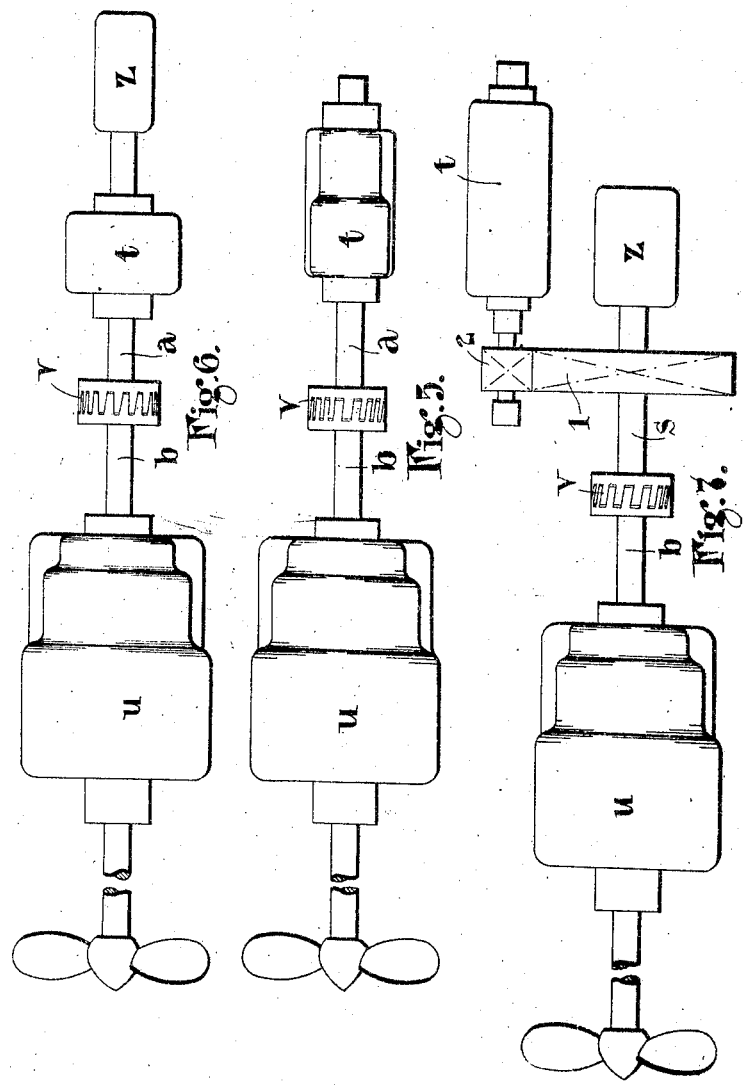

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

MARINE PROPULSION.

1,006,674.  Specification of Letters Patent.  Patented Oct. 24, 1911.

Application filed July 17, 1911.  Serial No. 639,059.

*To all whom it may concern:*

Be it known that we, CHARLES ALGERNON PARSONS, K. C. B., a subject of the King of Great Britain and Ireland, and residing at Heaton Works, Newcastle-upon-Tyne, and STANLEY SMITH COOK, a subject of the King of Great Britain and Ireland, and residing at Turbinia Works, Wallsend-upon-Tyne, both in the county of Northumberland, England, have invented certain new and useful Improvements in and Relating to Marine Propulsion, of which the following is a specification.

This invention relates to improvements in marine turbine installations and particularly in the arrangement by which the thrust propelling the ship is transferred from the parts which are generating this thrust, such as a propeller, to the structure of the ship.

Instead of providing thrust blocks or balancing surfaces subjected to fluid pressure, it is common practice in marine turbine installations to arrange that this thrust is taken partly or entirely by the pressure of the steam between the rotor and the casing of the turbine and transmitted by the latter to the structure of the ship. In such cases the balancing thrust of the steam or other fluid has been arranged to be approximately proportional to the torque and therefore approximately proportional to the thrust of the propeller at all powers. It is found, however, especially where cruising or supplementary turbines are employed, that difficulty may be experienced in thus effecting the balancing of the thrust, and the object of the present invention is to provide a solution of this difficulty.

The invention consists for this purpose in a marine turbine installation having a coupling allowing for lateral independent movement of, and giving, according to the requirements of the installation, the desired relation between the torque and thrust transmitted between portions of a shaft in which a thrust is produced by the propeller.

The invention also consists in the marine turbine installations hereinafter described.

Figure 1:
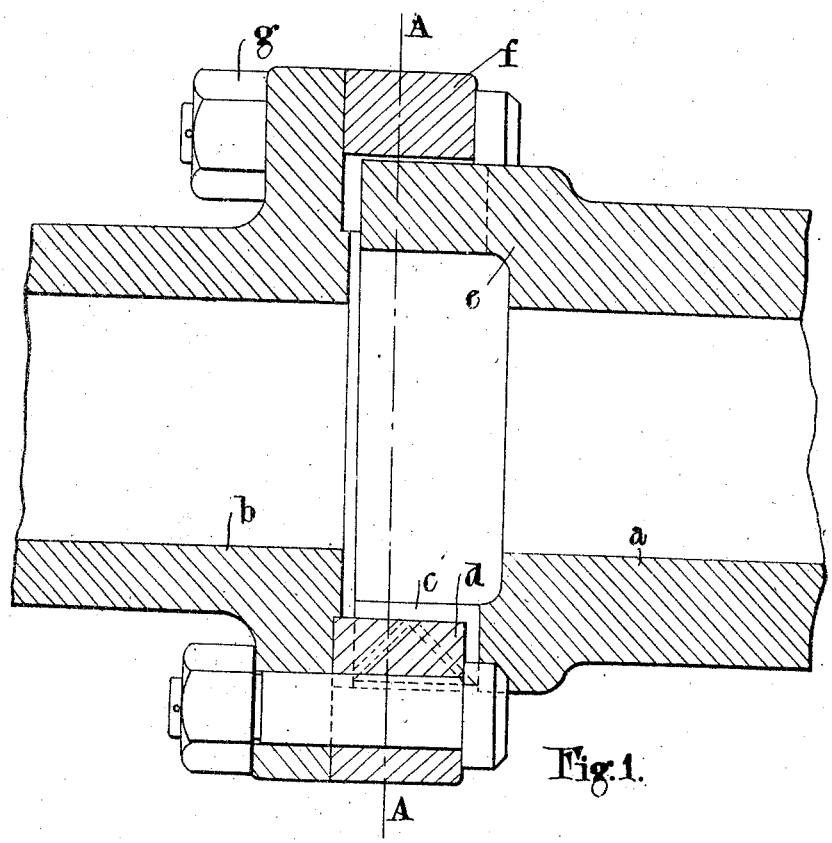
Figure 3:
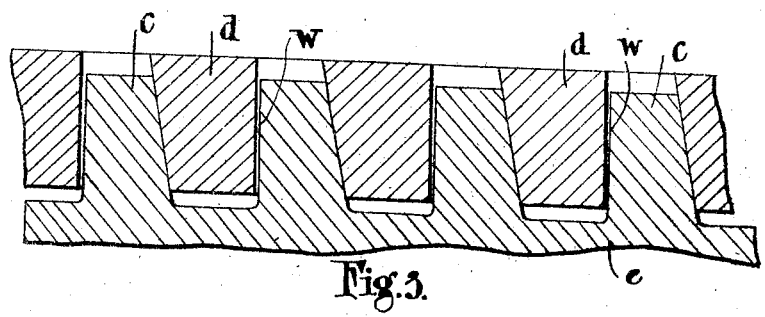
Figure 2:
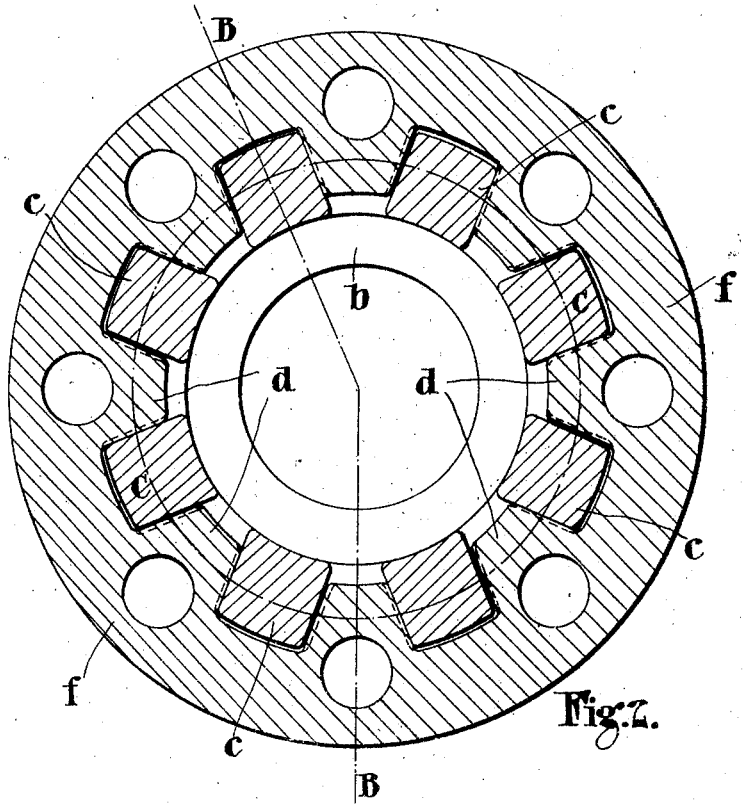
Figure 4:
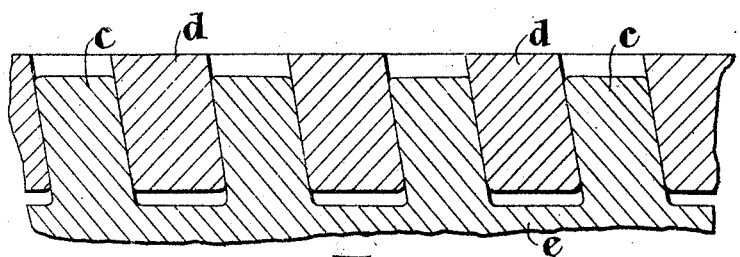

Referring now to the accompanying drawings, Figure 1 is a longitudinal sectional elevation of a known form of coupling which is suitable for use in a marine turbine installation according to the present invention, the section being taken on the line B—B of Fig. 2. Fig. 2 is a transverse sectional view on the line A—A of Fig. 1. Figs. 3 and 4 are developed sections on the line C—C of Fig. 2, and show two forms of interengaging teeth having helical surfaces, while Figs. 5, 6 and 7 show several marine turbine installations according to the present invention.

For the purpose of the present invention the form of coupling adopted is immaterial, so long as it fulfils the condition that it shall produce between two portions of a line of shafting, a thrust which is proportional to the torque transmitted between these portions. Such couplings usually have two corresponding parts having engaging surfaces such as teeth, the inclination of which surfaces is determined so as to give the required ratio between the thrust exerted between the two portions of the line of shafting and the force which, acting at the radius of the component parts of the coupling to produce rotation, gives the torque it is required to transmit by the coupling.

A coupling fulfilling the above condition is shown in Fig. 1 in which the shaft portion, $a$, is transmitting its torque to the other portion, $b$, the rotation in the case shown being clockwise as considered when looking from $a$ to $b$. The two shaft portions are in this case connected by intermittent claws or teeth, $c$ and $d$, having helical faces projecting at the proper helical pitch from a pair of concentric sleeves $e$, and $f$, respectively, carried by the shaft portions, $a$ and $b$.

The preferable forms of teeth are shown in Figs. 3 and 4 which are developed sections on the line C—C of Fig. 2. The engaging surfaces of the teeth $c$ and $d$, are parts of a helical surface having a pitch angle sufficient to give the desired amount of balancing thrust. The concentric sleeves $e$ and $f$, it will be seen, may in some cases be attached to or formed integral with the other shaft portion, $a$, or as shown in Fig. 1 one sleeve $f$ is attached to the shaft portion $b$ by bolts $g$ while the other sleeve $e$ is formed integral with the other shaft portion $a$. With the arrangement of teeth shown in Fig. 3, the following faces, $w$, are parallel to the axis of the shafts so that when the main turbine shaft, $b$ is driving the cruising turbine shaft, $a$, idly in the ahead direction the torque is transmitted without generating lateral thrust. Alternatively these claws or teeth, $c$ and $d$, may project radially inward and radially outward from external and internal sleeves in the form of a multiple screw thread of large pitch, in all cases it being immaterial which of the two shaft portions to be coupled carries the external or internal sleeve.

Another suitable form of coupling fulfilling the required conditions is that in which the two shaft portions such as $a$ and $b$, are provided with flanges coupled together by links placed obliquely with respect to the shaft axis. These connecting links are preferably made of sufficient length to render negligible the effect of small relative displacement of the parts of the coupling due to expansion by heat or to other causes, and consist usually in bars secured to the flanges by suitable set screws. Instead of the above link members which are in tension, when the coupling is in operation, struts which would be in compression when in operation may be employed. The amount of relative movement of the two shaft portions $a$ and $b$, in such couplings is usually limited by bolts which are securely fixed to the flange on one shaft portion and pass through a hole in the flange on the other portion, this hole being slightly oval in order to allow of a small movement of the bolt therein.

The invention it will be seen can be carried into effect by any other suitable form of coupling already known. For instance, the marine installations diagrammatically illustrated in Figs. 5, 6 and 7 comprise one or more cruising turbines, $t$, for use at low powers, coupled to the shaft of one or more main turbines, $u$. At all powers the propeller thrust due to the power generated by the main turbines, is approximately balanced by the steam thrust in these turbines, or in any other suitable manner. When however, some or all of the cruising turbines, $t$ are in use, it will be seen that additional power is generated and the propeller thrust consequently increased on the shaft on which these turbines are mounted. In the construction hitherto adopted this additional thrust has been absorbed by the main turbine thrust block, or in some cases has been transmitted by a rigid coupling between the shaft of the cruising turbine and the shaft of the main turbine, and balanced by the steam thrust in the cruising turbine itself. Both these methods of absorbing the extra thrust are objectionable, as in the first alternative, the main turbine thrust block is subjected to a considerable force while in the second the use of a rigid coupling prevents the adjustment of the cruising turbine rotor with regard to its stator, and differential expansions of the two turbines lead to increased leakage losses in the cruising turbine. According to the present invention, however, both these disadvantages are overcome.

In the installation shown in Fig. 5, the shaft $a$ of the cruising turbine, $t$, is connected to the main shaft $b$ of the main turbine, $u$, through a flexible coupling $v$, of one or other of the forms already described, and by this means the cruising turbine, $t$ is free and its adjustment can be effected within itself by its own adjusting block, without undue pressure, in the usual manner, while additional propeller thrust thus produced by the additional power on the shaft when the cruising turbine, $t$, is in operation can be also accurately balanced within the cruising turbine itself. In some cases a coupling may be employed to transmit the thrust to an additional thrust block, or to separate steam or hydraulic balancing arrangements.

In Fig. 6, is shown an arrangement similar to that of Fig. 5 except that the motor, $t$, transmits only turning force to the shaft, $a$ while the thrust corresponding to this turning force is absorbed by the separate thrust block, $z$, the coupling, $v$, maintaining in consequence of the slope of its engaging faces, the correct relation between the turning force of the motor $t$, and the thrust absorbed by $z$.

Fig. 7 illustrates an installation in which a cruising turbine or other motor, $t$, is coupled to the propeller shaft $b$, through gearing 1, 2. In such an arrangement the gearing transmits only turning effort to the shaft $s$, which is connected to the propeller shaft $b$, through a form of coupling $v$, and the additional thrust on the propeller shaft consequent on the added power transmitted through the gearing to the shaft $s$, would be thrown by this coupling onto the additional thrust block $z$, or other absorbing means mounted on the gear wheel shaft $s$.

It will be seen that the manner in which this invention is carried into effect can be considerably modified, and also that the invention can be modified without in any way departing from the spirit of the same, and that the same is not limited to the particular installations herein referred to.

Having now described our invention what we claim as new and desire to secure by Letters Patent is:—

1. In combination in a marine turbine installation, means connecting two portions of a shaft, said means producing a thrust which is proportional to the torque transmitted between the shaft portions and which acts to balance the propeller thrust.

2. In combination in a marine turbine installation, means connecting two portions of a shaft, said means allowing free lateral independent movement of and producing a thrust which is proportional to the torque transmitted between the shaft portions and which acts to balance the propeller thrust.

3. In combination in a marine turbine installation, a coupling connecting two portions of a shaft, interengaging helical surfaces formed on said coupling whereby there is produced a thrust which is proportional to the torque transmitted between the two shaft portions and which acts to balance the propeller thrust.

4. In combination in a marine turbine installation, a coupling connecting two portions of a shaft and comprising flanges having interengaging helical teeth whereby there is produced a thrust which is proportional to the torque transmitted between the shaft portions and which acts to balance the propeller thrust.

5. A marine turbine installation comprising in combination two turbine elements, mounted on separate portions of the same line of shafting, a propeller also mounted on the same line of shafting, connecting means between said shaft portions, said means producing a thrust which is proportional to the torque transmitted between the two shaft portions and which acts to balance the propeller thrust when both of said turbines are in operation.

6. A marine turbine installation comprising in combination, two turbines mounted upon separate portions of the same line of shafting, a propeller mounted on said line of shafting and connecting means between the shaft portions, said means allowing free lateral independent movement of the two shaft portions and producing a thrust which is proportional to the torque transmitted between the two shaft portions and which acts to balance the propeller thrust when both of said turbines are in operation.

7. A marine turbine installation comprising in combination two turbines mounted on separate portions of the same line of shafting, a propeller also mounted on said line of shafting, a thrust block absorbing the propeller thrust when one of said turbines is driving the propeller, and means connecting said shaft portions and allowing a free lateral independent movement between the two portions while at the same time producing a thrust which is proportional to the torque transmitted between the two shaft portions and which acts to balance the additional propeller thrust when the two turbines are in action.

8. A marine turbine installation comprising in combination two turbines mounted on separate portions of the same line of shafting, a propeller also mounted on the same line of shafting, a thrust block absorbing the propeller thrust when the propeller is being driven by one of the turbines, and means connecting said shaft portions and producing a thrust which is proportional to the torque transmitted between the shaft portions and which acts to balance the additional propeller thrust when the two turbines are driving the propeller.

9. A marine turbine installation comprising in combination two turbines mounted on separate shafts, a propeller mounted upon one of the shafts, a thrust block absorbing the thrust of the propeller, means for transmitting the power from the other turbine to the shaft on which the propeller is mounted and means connecting two portions of the latter shaft, said connecting means producing a thrust which is proportional to the torque transmitted between the two shaft portions and which acts to balance the additional propeller thrust when the propeller shaft receives additional power from the other turbine shaft.

10. A marine turbine installation comprising in combination two turbines mounted on separate shafts, a propeller mounted upon one of the shafts, a thrust block absorbing the thrust of the propeller, means for transmitting the power from the other turbine shaft to the shaft on which the propeller is mounted, and means connecting two portions of the latter shaft, said connecting means allowing a free lateral independent movement of the two shaft portions and producing a thrust which is proportional to the torque transmitted between the two shaft portions and which acts to balance the additional propeller thrust when the propeller shaft also receives power from the other turbine shaft.

In testimony whereof, we affix our signatures in presence of two witnesses.

CHARLES ALGERNON PARSONS.
STANLEY SMITH COOK.

Witnesses as to the signature of Charles Algernon Parsons:
  BERTRAN H. MATTHEWS,
  THOMAS H. WEST.

Witnesses as to signature of Stanley Smith Cook:
  FREDERICK JORDON HAY BEDFORD,
  WILLIAM SHEARER.